M. ROCKSTROH.
PRESSURE REGULATOR FOR PLATEN PRINTING PRESSES.
APPLICATION FILED APR. 10, 1914.
1,147,046.
Patented July 20, 1915.
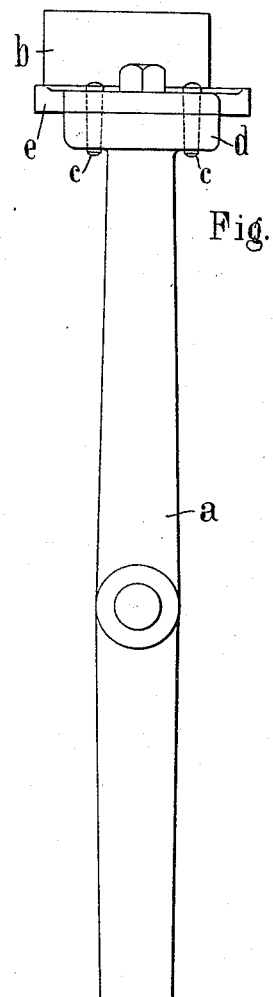
Fig. 1
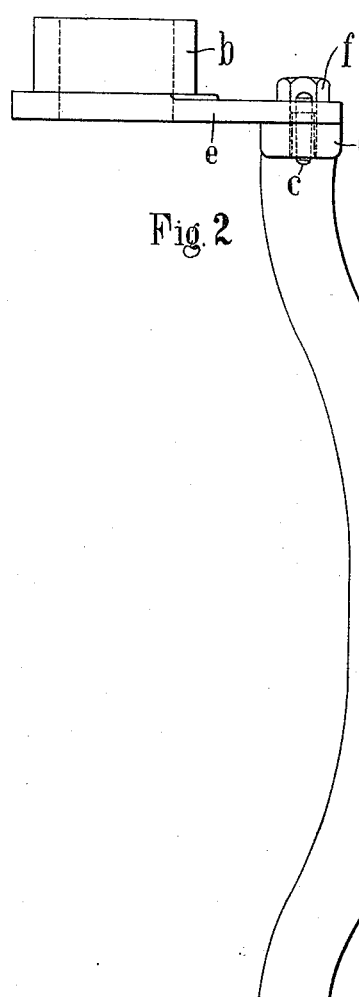
Fig. 2
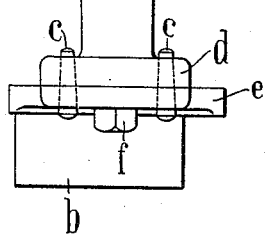
Fig. 3
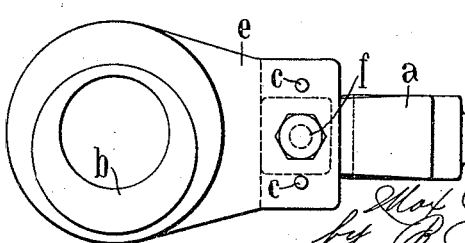

UNITED STATES PATENT OFFICE.

MAX ROCKSTROH, OF KLEIN-SEDLITZ, NEAR PIRNA, GERMANY.

PRESSURE-REGULATOR FOR PLATEN PRINTING-PRESSES.

1,147,046.          Specification of Letters Patent.          Patented July 20, 1915.

Application filed April 10, 1914. Serial No. 830,958.

*To all whom it may concern:*

Be it known that I, MAX ROCKSTROH, manufacturer, a subject of the King of Saxony, Germany, residing at Klein-Sedlitz, near Pirna, Saxony, Germany, have invented certain new and useful Improvements in Pressure-Regulators for Platen Printing-Presses, of which the following is a specification.

This invention relates to pressure regulators for platen printing presses.

In pressure regulators customary heretofore comprising bows the eccentrics of the pressure regulators were provided with lugs bent at right angles, to which the bows were screwed.

The manufacture of these pressure regulators customary heretofore is difficult and occupies much time, so that they are expensive. A pressure-regulator eccentric having angular lugs can be made only partially on the lathe. The face on which the bow is mounted can be worked on the lathe just as little as the bow itself; it is therefore necessary to set up the eccentric on a milling machine for working the said face. Such setting up, however, causes from the first inexactness which is increased when the bow is itself made somewhat inexactly. For this reason, after the pressure regulator has been assembled it must be refitted with considerable trouble.

These disadvantages are avoided in the subject-matter of this invention by directly connecting the end faces of the pressure-regulator bow with the turned flanges of the eccentrics by bolting or otherwise.

Owing to the omission of the angular lug on the eccentric the latter can be finished completely, including its side faces, on the lathe. For this reason the faces of the flange are obtained exactly at right angles to the direction of the hole in the eccentric; as the two end faces of the regulator bow can be made at the same time and exactly parallel to one another on a standard double milling-machine, after the eccentric and bow have been screwed together they fit one another exactly and require no subsequent fitting. It will be understood from this that the pressure regulator according to the invention can be made materially cheaper, quicker and more exactly than those known heretofore.

The form of the pressure regulator has, in addition, special advantages for the operation of the presses. On the one hand the regulator runs considerably more easily because perfect parallelism of the two eccentrics is assured without disadvantageous loosening of the parts being necessary; for, the end faces of the regulator bow can be made perfectly parallel without any difficulty, as mentioned above, and the flanges of the eccentrics assure the parallelism because the faces of the flanges can be made exactly at right angles to the bore of the eccentric. Further, the easy running of the pressure regulator is at the same time equivalent to a safety device, because the pressure regulator can be exceedingly readily stopped at the moment of danger when spoilage is threatened.

In the constructions known heretofore this was not possible because slight jamming of the pressure-regulator eccentric sufficed to influence unfavorably the working of the regulator.

In the accompanying drawing the pressure regulator is represented in Figure 1 in front elevation, in Fig. 2 in top plan view, and in Fig. 3 in side elevation.

The end faces $d$ of the pressure-regulator bow $a$ bear against the flanges $e$ of the pressure-regulator eccentrics $b$. The pressure-regulator bow is attached by means of screws $f$; the bow $a$ is prevented from turning relatively to the eccentrics $b$ by conical pins $c$ which take into the flanges $e$ of the eccentrics and into the bow.

I claim:—

In a platen printing press the combination of a pressure regulator arm with pressure regulator eccentrics, flanges upon said eccentrics against which bear the end faces of said arm, screws for securing said arm to said eccentrics, and conical pins entering said flanges of the eccentrics for preventing rotation of said arm.

In testimony whereof I have hereunto set my hand in presence of two subscribing witnesses.

MAX ROCKSTROH.

Witnesses:
　PAUL ARRAS,
　WALTER STADELMANN.

Copies of this patent may be obtained for five cents each, by addressing the "Commissioner of Patents, Washington, D. C."